United States Patent Office 3,346,625
Patented Oct. 10, 1967

3,346,625
OXIDATIVE CARBONYLATION OF OLEFINS IN THE PRESENCE OF A DEHYDRATED ALUMINOSILICATE MOLECULAR SIEVE
Donald M. Fenton, Anaheim, and Kenneth L. Olivier, Placentia, Calif., assignors to Union Oil Company of California, Los Angeles, Calif., a corporation of California
No Drawing. Filed Mar. 29, 1965, Ser. No. 443,638
10 Claims. (Cl. 260—497)

This invention relates to the oxidative carbonylation of olefins to carboxylic acids, and in particular, relates to oxidative carbonylation of olefins to unsaturated carboxylic acids in a reaction medium containing a dehydrated aluminosilicate molecular sieve.

U.S. patent application, Ser. No. 371,751, filed June 1, 1964, discloses a method for the preparation of alpha, beta-unsaturated carboxylic and beta-acyloxycarboxylic acids by an oxidative carbonylation reaction. The disclosed process comprises contacting an olefin, carbon monoxide and oxygen in an organic solvent containing a platinum group metal and, optionally, a redox agent. Spurious side reactions such as oxidation of the organic materials to carbon dioxide can result in the formation of water during the reaction. Accordingly, the reaction medium of the aforedescribed process is maintained substantially anhydrous and preferably entirely anhydrous by the addition of an organic dehydrating agent thereto. While such organic agents have proven to be effective dehydrators, they are expensive and react with water to form reaction products which are often difficult to separate from the reaction medium. Further, such organic dehydrating agents can not easily be regenerated for reuse.

It is an object of this invention to provide a method for the oxidation of olefins to carboxylic acids in the presence of an inorganic dehydrating agent.

It is an additional object of this invention to provide a method for the continuous oxidation of olefins to carboxylic acids in the presence of a dehydrated aluminosilicate molecular sieve that can be regenerated for continued use in the reaction.

Other and related objects will be apparent from the following description.

We have now found that unsaturated carboxylic acids can be prepared by contacting an olefin, carbon monoxide and oxygen with an organic solvent containing a catalyst comprising a platinum metal and, optionally, a redox agent, and an inorganic dehydrating agent comprising a dehydrated aluminosilicate molecular sieve which is non-reactive with the organic reactant and the product and the catalyst and insoluble in the reaction medium at the reaction conditions. When the reaction is performed in a nonreactive organic solvent, the alpha, beta-unsaturated carboxylic acid can be obtained directly. When the organic solvent comprises an aliphatic or aromatic carboxylic acid, beta-acyloxycarboxylic acids are also obtained. These products, which comprise carboxylic acid esters of beta-hydroxycarboxylic acids can readily be pyrolyzed by thermal and/or catalytic processing to provide complete conversion to the alpha, beta-unsaturated carboxylic acids.

During the oxidative reaction, the platinum group metal is reduced from a higher valency state to a lower valency. The reduced metal is then oxidized to the higher valency by contacting it with oxygen. Preferably, a suitable redox agent is employed to facilitate the oxidation. The overall reaction is as follows:

wherein the olefin is as hereinafter described and the catalyst employed is a platinum group metal with, optionally, quantities of a redox agent.

The reaction is performed under liquid phase conditions with a solvent comprising an organic solvent of the type hereinafter described. The reaction can be performed under relatively mild conditions and exhibits an attractive rate at reaction conditions comprising temperatures from about 30° to about 300° C. and sufficient pressures to maintain liquid phase conditions, preferably from about atmospheric to about 200 atmospheres or more, the higher pressures being favored to accelerate the reaction.

Water is eliminated from the system in accordance with our present invention, during the reaction by the addition of a molecular sieve, i.e., a crystalline aluminosilicate zeolite, to the reaction zone. Substantial quantities of the molecular sieve in the solvent are not necessary because water is not formed in the desired oxidative carbonylation recation, but rather is generated only by the undesired and minor side reactions. Accordingly, we maintain anhydrous conditions by the use of from about 0.1 to about 50, preferably from 2 to about 20, and most preferably from 5 to about 15 weight percent of a calcined, i.e., dehydrated, molecular sieve in the reaction medium.

As used herein, the term molecular sieve is meant to comprise crystalline aluminosilicates or zeolites which are either naturally occurring or synthetic compositions of alumina and silica having a crystalline structure, a characteristic X-ray diffraction pattern, and a relatively uniform pore size from about 4 to 13 Angstrom units. Based on their ability to preferentially adsorb various compounds within the pores, these materials have come to be known as molecular sieves.

The preparation of synthetic molecular sieves is a well established art; see U.S. 2,882,243 and 2,882,244 wherein a method of preparation is set forth comprising the mixing of sodium silicate, sodium aluminate and sodium hydroxide to form a gel. The gel is then maintained at a temperature between about 100° and 160° C. to induce crystallization of the solid therefrom, then filtered, washed and pelleted or compacted to the desired form. The solid is then calcined at a temperature from about 200° to about 500° C. to dehydrate the solid and form an active molecular sieve. The sodium cations associated with the molecular sieve can be replaced with different cations by washing with an aqueous solution of a soluble salt of the other cation to base exchange all or a portion of the sodium with one or more of the chosen cations, e.g., hydrogen, ammonium, lithium, potassium, calcium, magnesium, silver, zinc, nickel, strontium, palladium, platinum, iron, cobalt, etc. A description of the base exchange procedure can be found in the aforesaid patents.

Any of the naturally occurring or synthetic molecular sieves which are inert to the reaction medium and the oxidation conditions employed in our oxidative carbonylation can be employed. Preferably, zeolites having a silica to alumina molecular ratio of at least about 3 and most preferably greater than 5 are employed to insure that the molecular sieve is inert toward the carboxylic acid generally employed as the reaction solvent and toward halogen acids formed on reduction of the redox system. Examples of suitable naturally occurring zeolites having the aforementioned silica to alumina ratios are: ptilolite, mordenite, laumontite, ferrierite, erionite, epistilbite, stilbite, heulandite, dachriardite, harmontone, etc. Various synthetic zeolites having ratios of silica to alumina greater than about 5 are: zeolite S, zeolite Y, zeolite Z and zeolite T, etc.

The olefin oxidized in accordance with the invention can, in general, comprise any olefinic compound having from about 2 to about 25 carbons. The olefin should have at least one hydrogen bonded to at least one of the olefinic carbons and thus should be one of the following:

(1) Ethylene and substituted ethylenes such as

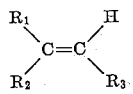

wherein $R_1$, $R_2$ and $R_3$ are hydrogen, alkyl, cycloalkyl, aryl, alkaryl, aralkyl, alkenylalkyl, alkenylaryl, halo, haloalkyl, haloaryl, carboxyalkyl, carboxylaryl, acyloxy or nitroaryl;

(2) Cycloalkenes and substituted cycloalkenes such as

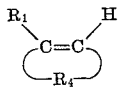

wherein $R_1$ is as previously mentioned and $R_4$ is an alkylene group or isoalkylene group having from 2 to about 6 carbons; or (3) Alkylene cycloalkenes such as

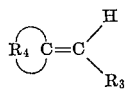

wherein $R_3$ and $R_4$ are as previously mentioned.

Examples of useful olefins are the aliphatic hydrocarbon olefins such as ethylene, propylene, butene-1, butene-2, pentene - 2, 2 - methylbutene - 1, hexene - 1, octane - 3, 2-propylhexene-1, decene-2, 4,4'dimethylnonene-1, dodecene-1, 6-propyldecene-1, tetradecene-5, 2-amyldecene-3, hexadecene-1, 4-ethyltridecene-2, octadecene-1, 4,4-dipropyldodecene-3, eicosene-7, etc. Of these the aliphatic hydrocarbon olefins having from 2 to about 6 carbons are preferred.

Other olefins include: vinylcyclohexane, allylcyclohexane, styrene, p-methylstyrene, p-vinylcumene, vinylnaphthalene, 1,2-diphenylethylene, 6-phenylhexene-1, 1,3-diphenylbutene-1, 3-benzylheptene-3, o-vinyl-p-xylene, p-chlorostyrene, m-nitrostyrene, divinylbenzene, 1,5-heptadiene, 2,5-decadiene, vinyl chloride, vinylidene dichloride, vinyl fluoride, trichloroethylene, trifluoroethylene, 1,1-bis-chloromethyl ethylene, propenyl chloride, p-vinylbenzoic acid, p-allylphenyl acetic acid, vinyl acetate, vinyl propionate, propenyl acetate, butenyl caporate, ethylidene diacetate, etc.

Cycloalkenes, their substituted derivatives and alkylene cycloalkenes include: cyclobutene, cyclopentene, cyclohexene, methylcyclohexene, amylcyclopentene, cycloheptene, cyclooctene, cyclodecene, methylenecyclohexane, ethylidene cyclohexane, propylidene cyclohexane, etc.

As previously mentioned, the reaction is performed under liquid phase conditions in the presence of a liquid organic solvent which has a solvency for the catalyst and which, preferably, is inert to the reaction conditions. Various organic liquids can be employed for this purpose such as sulfones, amides, ketones, ethers and esters. Also, carboxylic acids such as the lower molecular weight fatty acids or benzene carboxylic acids can also be employed as a solvent.

Illustrative of this last class of solvents are acetic, propionic, butyric, pentanoic, hexanoic, heptanoic, octanoic acids, benzoic, toluic, phthalic acids, etc. Of these, the fatty carboxylic acids having from about 2 to about 8 carbons are preferred. The carboxylic acids are not entirely inert under the oxidation conditions in that the carboxylic acids add to the olefin double bond to form beta-acyloxy compounds. These materials, however, can be readily pyrolyzed to recover both the carboxylic acid for reuse as a reaction medium and the desired unsaturated acid.

Other organic solvents that can be employed include the alkyl and the aryl sulfones such as di-isopropylsulfone, butylamylsulfone, methylbenzylsulfone, etc.

Another class of organic solvents that have sufficient solvency for the catalyst salts and that are inert to the oxidative carboxylation are various amides such as formamide, N,N - dimethylformamide, N,N - ethylisopropylformamide, acetamide, N-phenylacetamide, N,N-dipropylacetamide, iso - butyramide, N - ethylisobutyramide, isovaleramide, N,N-dimethylisovaleramide, isocaprylamide, N,N-methyl-n-caprylamide, N-propyl-n-heptanoyl amide, iso-undecylamide, etc.

Various alkyl and aryl ketones can also be employed as a reaction solvent, e.g., acetone, methyl ethyl ketone, diethyl ketone, di-isopropyl ketone, ethyl n-butyl ketone, methyl n-amyl ketone, cyclohexanone, di-iso-butyl ketone, etc.

Ethers can also be employed as a reaction solvent, e.g., di-iso-propyl ether, di-n-butyl ether, ethylene glycol di-iso-butyl ether, methyl o-tolyl ether, ethylene glycol di-butyl ether, di-iso-amyl ether, methyl p-tolyl ether, methyl m-tolyl ether, dichloroethyl ether, ethylene glycol di-iso-amyl ether, diethylene glycol diethyl ether, ethyl benzyl ether, diethylene glycol di-ethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as a solvent, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malonate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-dibutyl phthalate, etc.

As previously mentioned, the reaction medium should contain catalytic amounts of a platinum group metal. The platinum group metal can be of the palladium sub-group or the platinum sub-group, i.e., palladium, rhodium, or ruthenium, or platinum, osmium, rhenium or iridium. While all of these metals are active for the reaction, we prefer palladium because of its demonstrated greater activity. The platinum group metal can be employed in amounts between about 0.001 and about 5 weight percent of the liquid reaction medium; preferably between about 0.04 and about 2.0 weight percent. The platinum group metal can be added to the reaction medium as a finely divided metal, as a soluble salt or as a chelate. Preferably, the metal in its most oxidized form, i.e., as a soluble salt or chelate, is introduced into the reaction zone to avoid the formation of undesired quantities of water. Examples of suitable salts are the halides and carboxylates of the metals such as platinum chloride, rhodium acetate, ruthenium bromide, osmium propionate, iridium benzoate, palladium isobutyrate, etc. Examples of suitable chelates are palladium acetylacetonate, and complexes of the palladium group metal ions with such conventional chelating agents as ethylene diamine tetraacetic acid, citric acid, etc.

To facilitate the rate of oxidation by rendering it more facile to oxidize the reduced form of the platinum metal, we prefer to employ a reaction medium that contains a halogen, i.e., a bromine- or chlorine- (preferably a chlorine) containing compound. The halogen can be added as elemental chlorine or bromine; however, it is preferred to employ less volatile halogen compounds such as hydrogen, alkali metal or ammonium halides, e.g., hydrogen chloride; hydrogen bromide, cesium chloride, potassium bromide, sodium bromate, lithium chlorate; ammonium bromide, ammonium chloride, etc. Also, any of the aforementioned platinum group metals can be added to supply a portion of the bromide or chloride and, when the hereafter mentioned multivalent redox salts are employed, these too can be added as a chloride or bromide. Various organic compounds which liberate chlorine, bromine, hydrogen chloride or bromide under the reaction conditions can also be used, such as aliphatic chlorides or bromides, e.g., ethylene bromide, propylene chloride, butyl chloride, benzyl bromide, phosgene, etc.

In general, sufficient of any of the aforementioned halogen-containing compounds can be added to provide between about 0.05 and about 5.0 weight percent free or coordinately bonded or covalently bonded halogen in the reaction zone; preferably concentrations between about 0.1 and about 3.0 weight percent are employed. This amount of halogen is preferably also in excess of the stoichiometric quantity necessary to form the halide of the most oxidized state of platinum group metal, e.g., in excess of two atomic weights of halogen per atomic weight of palladium present. In this manner, a rapid oxidation can be achieved.

As previously mentioned, various redox compounds can optionally be used in the reaction medium to accelerate the rate of reaction. In general, any multivalent metal salt having an oxidation potential higher, i.e., more positive, than the platinum metal in the solution can be used. Typical of such are the soluble salts of the multivalent metal ions such as the carboxylates, e.g., propionates, benzoates, acetates, etc.; nitrates; sulfates; halides, e.g., bromides, chlorides, etc.; of copper, iron, manganese, cobalt, mercury, nickel, cerium, uranium, bismuth, tantalum, chromium, molybdenum or vanadium. Of these, cupric and ferric salts are preferred and cupric salts are most preferred. In general, the multivalent metal ion salt is added to the reaction medium to provide a concentration of the metal therein between about 0.1 and about 10 weight percent; preferably between about 0.5 and about 3.0 weight percent.

Various other oxidizing agents can also be employed to accelerate the rate of reaction. Included in such agents are the nitrogen oxides that function as redox agents similar to those previously described. These nitrogen oxides can be employed as the only redox agent in the reaction medium or they can be employed jointly with one or more of the aforedescribed redox metal salts such as a combination of a nitrogen oxide and a cupric redox agent or ferric redox agent. In general, between about 0.01 and about 3 weight percent of the reaction medium; preferably between about 0.1 and about 1 weight percent; calculated as nitrogen dioxide can comprise a nitrogen oxide that is added as a nitrate or nitrite salt or nitrogen oxide vapors. The nitrogen oxides can be added to the reaction medium in various forms, e.g., nitrogen oxide vapors such as nitric oxide, nitrogen dioxide, nitrogen tetraoxide, etc. can be introduced into contact with the reaction medium during the oxidation to fix the aforementioned nitrogen oxide content therein or soluble nitrate or nitrite salts such as sodium nitrate, lithium nitrate, lithium nitrite, potassium nitrate, cesium nitrate, etc. can be added to the reaction medium.

The process may be operated in a continuous manner by using a platinum group metal and redox agent which participate in a catalytic manner. An olefin, carbon monoxide and oxygen are introduced into contact with a liquid reaction medium containing an inorganic acid anhydride of the aforementioned type. The carbonylation of the olefin and oxidation to the carboxylic acid results in the stoichiometric reduction of the platinum group metal. The introduction of oxygen serves to reoxidize the reduced metal to its more oxidized and active form. Continuous or intermittent introduction of oxygen can be employed; however, continuous introduction is preferred. Preferably, the rate of oxygen introduction is controlled relative to the olefin and carbon monoxide rates so as to maintain the oxygen content of the exit gases below the explosive concentration, i.e., less than about 10 and preferably less than about 3 volume percent. Under these conditions, the exit gas comprising chiefly the olefin and carbon monoxide can be recycled to the liquid reaction medium. When the olefin is a liquid under the reaction conditions, an inert gas such as nitrogen, air or mixtures of nitrogen and air can be employed to dilute the gas phase and exit gas stream from the reactor and thereby avoid explosive gas compositions.

Carbon monoxide is introduced into contact with the reactants at a sufficient rate to insure the desired carboxylation. Relative rates of the carbon monoxide based on the olefin can be from 1:10 to 10:1 molecular units per molecular unit of olefin, preferably rates from about 1:1 to about 5:1 and most preferably from 1:1 to 2:1 molecular ratios are employed.

The reaction can be employed under relatively mild conditions, e.g., temperatures from about 30° to about 300° C.; preferably from about 90° to about 200° C. are employed. The reaction pressure employed is sufficient to maintain a liquid phase and preferably, when gaseous olefins are employed, super atmospheric pressures are employed to increase the solubility of the olefin in the reaction medium and thereby accelerate the reaction rate. Accordingly, pressures from about atmospheric to about 200 atmospheres or more, preferably elevated pressures from about 10 to about 100 atmospheres are used.

During the oxidation, a portion of the liquid reaction medium can be continuously withdrawn and distilled to recover the desired products from the reaction medium and the catalyst salts therefrom can be recycled to the reaction zone for further contact. Water formed by spurious side reactions during the process is adsorbed by the molecular sieve incorporated in the reaction medium and is effectively removed from the liquid reaction medium. During the process, all or a portion of the molecular sieve can be withdrawn from the recycle medium or from the reaction zone and replaced with freshly dehydrated portions thereof to maintain anhydrous conditions in the oxidation zone.

The dehydrated molecular sieves can be readily achieved from the hydrated form by heating the latter to temperatures from about 200° to about 500° C. The regeneration of molecular sieve to a dehydrated condition can be effected in three steps of: heating, purging and cooling. The solid can be heated to temperatures from about 200° to 500° C., preferably from about 250° to 450° C. and the water removal can be facilitated by purging the solid with an inert gas, air, nitrogen, etc. having a dew point less than about 80° F. and preferably less than 50° F. The heat for regeneration can be supplied indirectly or the purge gas can serve as the heat transfer medium, as desired. After desorption of water, generally achieved in 10 minutes to 6 hours, the solid can be cooled by blowing a cool, inert and dry gas into contact with the solid. Upon cooling to the reaction temperature or lower, the solid can then be introduced into the reactor. In this manner, the process of our invention can be operated with continuous reusing of the dehydrating solid.

The following example will illustrate the practice of our invention and serve to demonstrate the results obtainable thereby:

Example 1

Into a ½ gallon autoclave were placed 1 gram palladium chloride, 5 grams lithium chloride, 5 grams lithium acetate dihydrate, 5 grams cupric chloride and 90 grams of sodium mordenite which had been calcined for 15 hours at 700° F. To the reactants were added 500 grams of acetic acid and the autoclave was then pressured to 450 p.s.i.g. with ethylene and then to 900 p.s.i.g. with carbon monoxide. The reactants were heated to 280° F. and oxygen was slowly introduced in small increments during a 10-minute reaction period. After completion of the reaction the autoclave was cooled and opened and the contents thereof were filtered to separate the solid sodium mordenite from the liquid products and reactants. The liquid filtrate was distilled to separate the acetic acid and recover 14 grams of acrylic acid and 43 grams of beta-acetoxypropionic acid. The oxidation also yielded 2.5 grams of propionic acid and 17 grams of carbon dioxide.

The reaction was repeated with 103 grams of lithium mordenite in place of the sodium mordenite and 25 grams of acrylic acid and 15 grams of polyacrylic acid with 12 grams of carbon dioxide were produced.

In repeated experiments, a portion of the reaction medium was replaced respectively with 100 milliliters of sulfolane and 100 milliliters of o-dichlorobenzene. Comparable yields of acrylic acid and beta-acetoxypropionic acid were achieved in these experiments.

When the reaction is performed in the absence of any dehydrating agent, the products from the oxidation are carbon dioxide, vinyl acetate and acetaldehyde with only minor amounts of acrylic acid or beta-acetoxypropionic acid being obtained.

When the experiment is repeated using propylene instead of ethylene, crotonic acid is obtained as the major product.

The preceding examples are intended solely to illustrate a mode of practicing the invention and to demonstrate the results obtainable thereby. It is not intended that the preceding examples and disclosure be unduly limiting of the invention but rather that the invention be defined by the steps and their obvious equivalents set forth in the following method claims:

We claim:

1. The oxidative carbonylation of hydrocarbon olefins having from 2 to about 25 carbons that comprises contacting said olefin, oxygen and carbon monoxide with an organic reaction solvent at a temperature of 30° to about 300° C. and a pressure sufficient to maintain the solvent in liquid phase, said solvent containing from about 0.01 to about 5.0 weight percent of a catalyst comprising a platinum group metal and 0.1 to about 50 weight percent of a dehydrated molecular sieve comprising a crystalline aluminosilicate having a uniform pore diameter which is nonreactive with the organic reactants and products and the catalyst and insoluble in the reaction medium at the reaction conditions to thereby obtain an alpha,beta-ethylenically unsaturated acid having a total of one more carbon than said olefin.

2. The oxidation of claim 1 wherein said platinum group metal is palladium.

3. The oxidation of claim 1 wherein said catalyst also contains between 0.5 and 5.0 weight percent of a redox agent selected from the class consisting of nitrogen oxides, soluble salts of multivalent metals having an oxidation potential more positive in said solvent than said platinum metal and mixtures thereof.

4. The oxidation of claim 1 wherein said crystalline aluminosilicate is mordenite.

5. The oxidative carbonylation of claim 1 wherein said olefin is a hydrocarbon olefin having 2 to about 6 carbons.

6. The oxidative carbonylation of ethylene to acrylic acid which comprises introducing ethylene, oxygen and carbon monoxide into contact with an organic reaction solvent that contains from 0.01 to about 5.0 weight percent of a catalyst comprising a platinum group metal and 0.1 to about 50 weight percent of a molecular sieve comprising a crystalline aluminosilicate having a uniform pore diameter which is nonreactive with the organic reactants and products and the catalyst and insoluble in the reaction medium, said reaction being performed at a temperature between about 30° and about 300° C. and sufficient pressure to maintain said organic reaction solvent under liquid phase conditions at said temperature and thereby obtain said acrylic acid.

7. The oxidative carbonylation of claim 6 wherein said catalyst also contains between about 0.5 and 5.0 weight percent of a redox agent selected from the class consisting of nitrogen oxides, soluble salts of multivalent metal ions having an oxidation potential more positive than said platinum group metal, and mixtures thereof.

8. The oxidation of claim 6 wherein said crystalline aluminosilicate is mordenite.

9. The oxidative carbonylation of ethylene to acrylic and beta-acyloxypropionic acid that comprises contacting ethylene, oxygen and carbon monoxide with an aliphatic acid solvent containing a catalyst comprising between about 0.01 and 5.0 weight percent of palladium chloride and between about 0.5 and about 5.0 weight percent of cupric chloride and a molecular sieve comprising a crystalline aluminosilicate having a uniform pore diameter and a silica to alumina molecular ratio greater than about 5.0 at a temperature between about 30° and 300° C. and sufficient pressure to maintain said aliphatic acid in liquid phase.

10. The oxidation of claim 9 wherein said aliphatic acid is acetic acid.

References Cited

UNITED STATES PATENTS 3,065,242   11/1962   Alderson _____ 260—544

OTHER REFERENCES

Tsuji: Tetrahedron Letters, No. 16 (1963), pp. 1061–64.

LORRAINE A. WEINBERGER, *Primary Examiner.*

S. WILLIAMS, *Assistant Examiner.*